United States Patent
Armstrong et al.

(10) Patent No.: US 6,588,392 B2
(45) Date of Patent: Jul. 8, 2003

(54) FUEL EFFICIENT POWERTRAIN SYSTEM

(75) Inventors: Donald J. Armstrong, Troy, MI (US); Harold E. Durling, Elsie, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/931,980

(22) Filed: Aug. 17, 2001

(65) Prior Publication Data

US 2003/0034002 A1 Feb. 20, 2003

(51) Int. Cl.[7] .................................................. F02B 75/06
(52) U.S. Cl. .................................................. 123/192.1
(58) Field of Search .................... 123/192.1, 198 F, 123/481, 436

(56) References Cited

U.S. PATENT DOCUMENTS 5,786,640 A * 7/1998 Sakai et al. ............... 180/65.2
6,408,625 B1 * 6/2002 Woon et al. ............... 123/198 F

FOREIGN PATENT DOCUMENTS

JP         58126434 A   * 7/1983   ............ 123/192.1

* cited by examiner

*Primary Examiner*—Henry C. Yuen
*Assistant Examiner*—Hyder Ali
(74) *Attorney, Agent, or Firm*—Vincent A. Cichosz

(57) ABSTRACT

A powertrain system includes a cylinder deactivation system mechanically coupled to an internal combustion engine, and electrically coupled to an engine management system. The engine management system signals the cylinder deactivation system to selectively deactivate one or more engine cylinders. The engine continues to operate using the remaining available active engine cylinders, and generates an inconsistent torque output. A torque-smoothing device mechanically coupled to the engine, and electrically or hydraulically coupled to an energy storage device, removes and releases energy periodically to compensate for the inconsistent torque output.

30 Claims, 3 Drawing Sheets

FUEL EFFICIENT POWERTRAIN SYSTEM

TECHNICAL FIELD

This disclosure relates to powertrain systems and, more particularly, to cylinder deactivation powertrain systems.

BACKGROUND

Conventionally, applying cylinder deactivation on piston engine powertrains provides improved fuel economy over a combination of speeds and loads limited by excessive torque pulses. However, the limited speed-load range of those piston engine powertrains, where cylinder deactivation can be used, reduce the overall improvement in fuel economy to such a degree that few production vehicles employ cylinder deactivation. When cylinder deactivation is employed, one or more cylinders are fired and then skipped, or deactivated, and a time lapse occurs until the next cylinder fires. The resulting time lapse translates into roughness that can become a customer dissatisfier. This irregular or staggered torque output reduces the fuel economy efficiency otherwise available from cylinder deactivation. In addition, the exhaust emissions generally increase due to the inconsistent fuel delivery and combustion.

Accordingly, there exists a need to selectively fire cylinders without causing objectionable torque pulses and increasing emissions.

SUMMARY

The drawbacks and disadvantages of the prior art are overcome by the embodiments of the powertrain system described herein. The powertrain system comprises an engine coupled to a drive shaft, and a torque-smoothing device that is configured to sometimes assist the drive shaft by adding energy, and at other times to move energy from the drive shaft to the energy storage device. The engine is also equipped with a cylinder deactivation system configured to deactivate one or more engine cylinders, and a direct cylinder injection system configured to deliver fuel to firing cylinders. An engine management system is configured to provide control, diagnostic and maintenance operations for the powertrain system.

The method for operating the internal combustion engine comprises activating the engine, and deactivating one or more engine cylinders. When the engine generates an inconsistent torque output, a torque-smoothing system is activated to smooth the torque output of the engine.

BRIEF DESCRIPTION OF THE DRAWINGS

Referring now to the figures, which are meant to be exemplary, not limiting, and wherein like elements are numbered alike in the several figures.

DESCRIPTION OF THE PREFERRED EMBODIMENT

A powertrain system for an automotive vehicle comprises an internal combustion engine combined with a cylinder deactivation system. The cylinder deactivation system can deactivate one or more engine cylinders within the engine, thus allowing the engine to operate using less than all available cylinders. As the engine's cylinder use is decreased, the manifold absolute pressure of the engine can increase and fuel economy is improved. However, an inconsistent torque output results from the time lapses that occur when firing less than all available cylinders. To compensate for this inconsistent torque output, the powertrain system further comprises a torque-smoothing system. The torque smoothing system comprises a torque smoothing device and an energy storage device. The torque-smoothing device sends energy to the energy storage device during cylinder firing, and compensates for the reduction in torque output during cylinder deactivation by releasing energy when one or more cylinders are deactivated. To reactivate the deactivated engine cylinders without undesirable increases in exhaust emissions, the cylinder deactivation system can also reactivate one or more deactivated engine cylinders. The powertrain system improves the vehicle's fuel economy by allowing the engine to effectively operate using less than all available engine cylinders without causing objectionable torque pulses or emitting additional emissions.

In an alternative embodiment, the powertrain system can also include an auxiliary drive unit electrically coupled to the energy storage device, and mechanically coupled to at least two wheels, or at least two wheels and an engine output shaft. The auxiliary drive unit can provide all wheel drive and/or four-wheel braking ability to the vehicle. The auxiliary drive unit can send power to the energy storage device to provide regenerative braking ability. In addition, the auxiliary drive unit can also take power from the energy storage device and use it to propel the vehicle.

Figure 1:
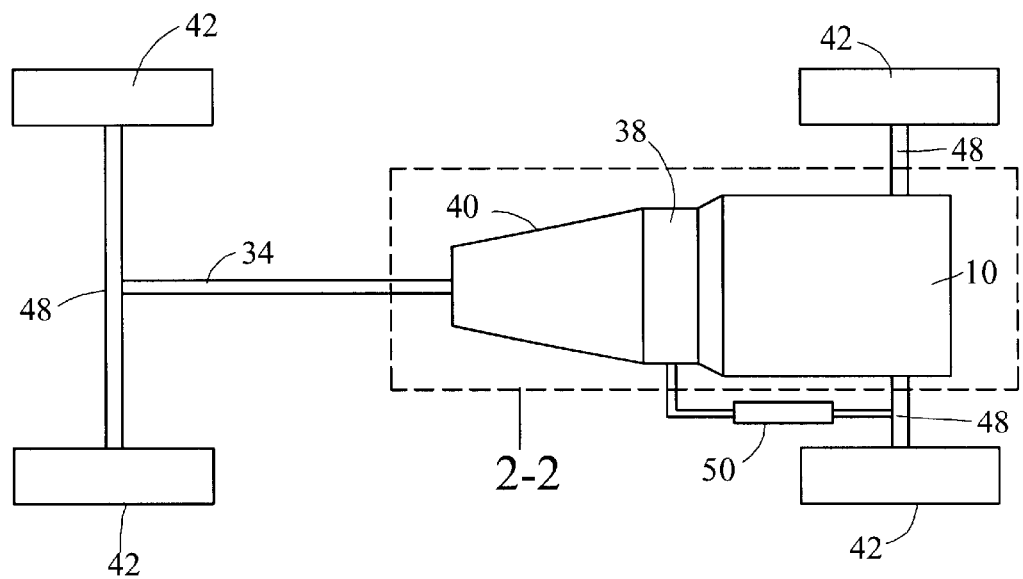
FIG. 1 illustrates a block diagram showing an embodiment of a vehicle drivetrain comprising a powertrain system, employing a torque smoothing system.
Figure 2:
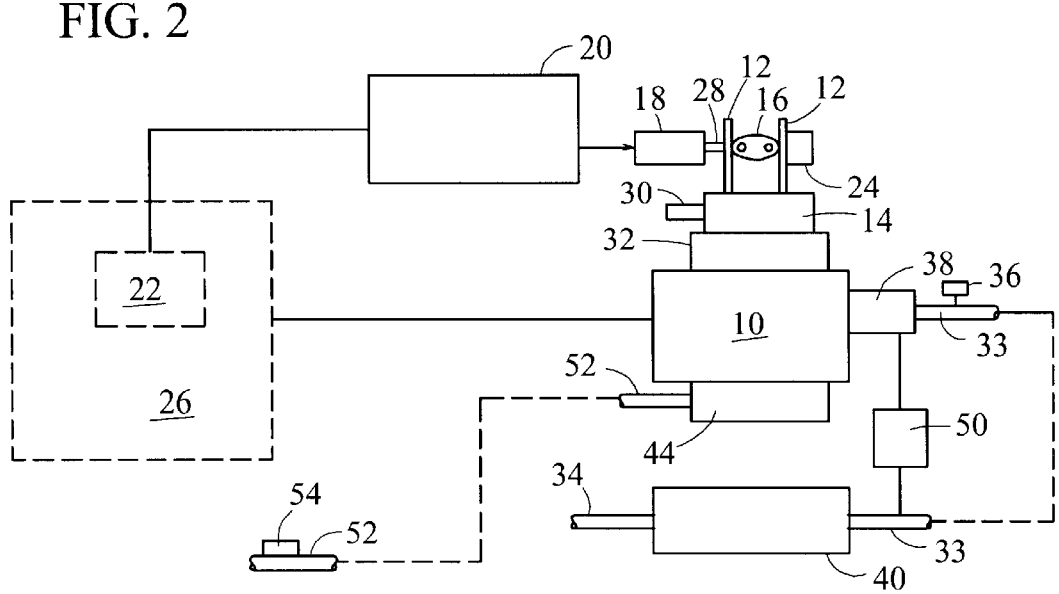
FIG. 2 illustrates a block diagram 2—2 of FIG. 1 showing the powertrain system employing a cylinder deactivation system and torque smoothing system.
Figure 3:
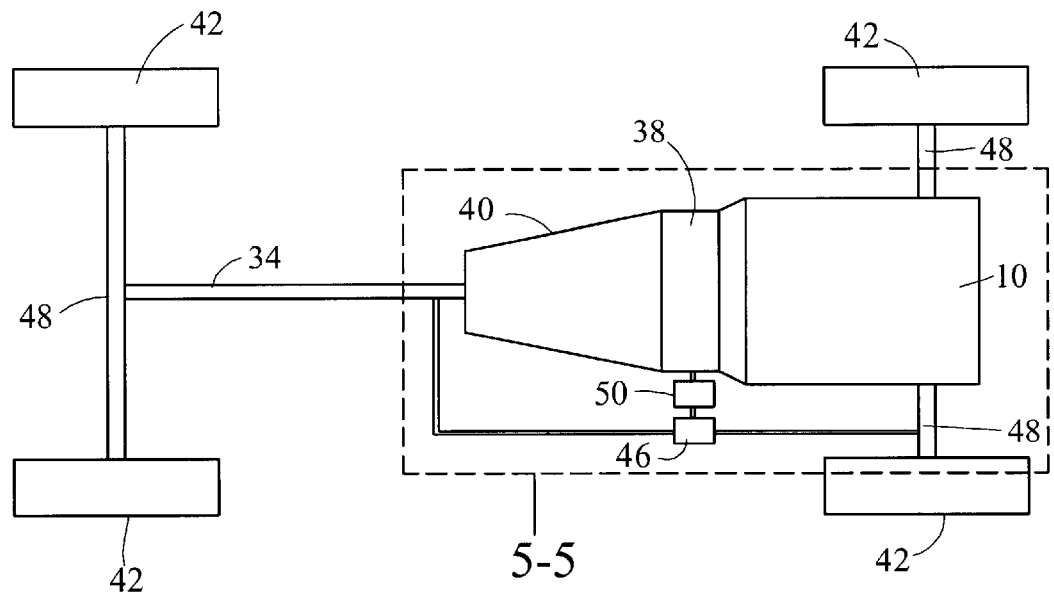
FIG. 3 illustrates a block diagram of an alternative embodiment of the vehicle drivetrain comprising a powertrain system employing a torque smoothing system and an auxiliary drive unit.
Figure 4:
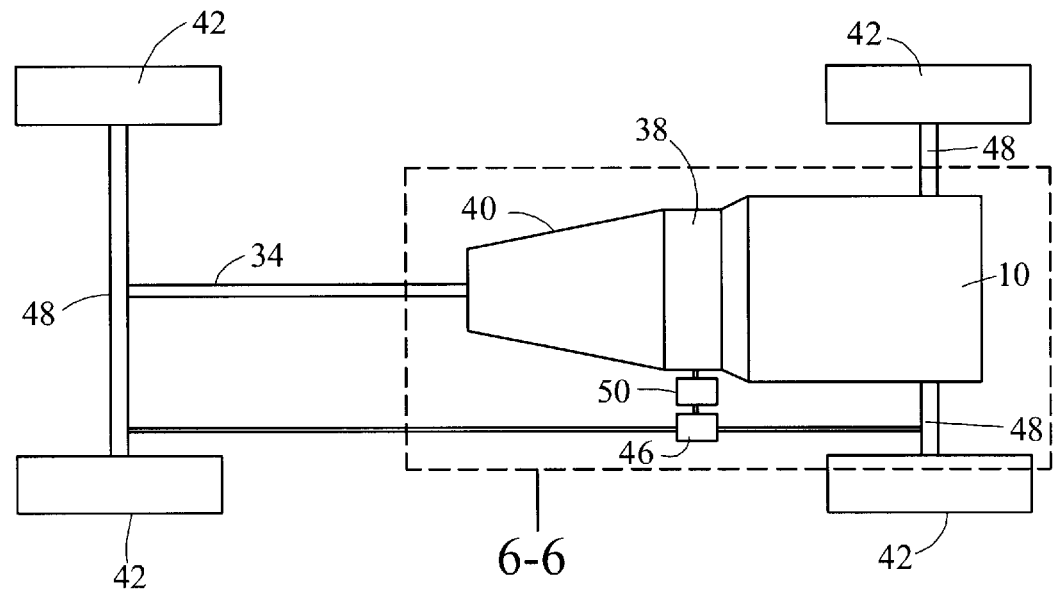
FIG. 4 illustrates a block diagram of another alternative embodiment of the vehicle drivetrain comprising a powertrain system employing a torque smoothing system and an alternative embodiment of the auxiliary drive unit.
Figure 5:
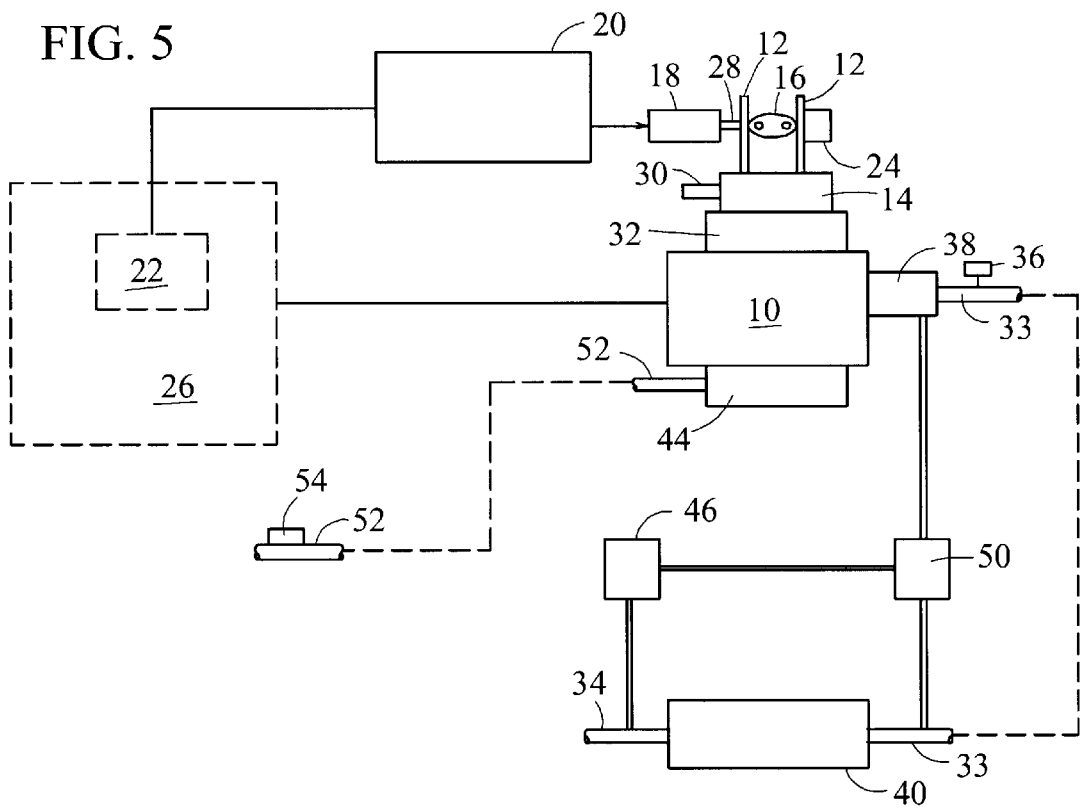
FIG. 5 illustrates a block diagram 5—5 of FIG. 3 showing the powertrain system employing a cylinder deactivation system, torque smoothing system and an auxiliary drive unit.
Figure 6:
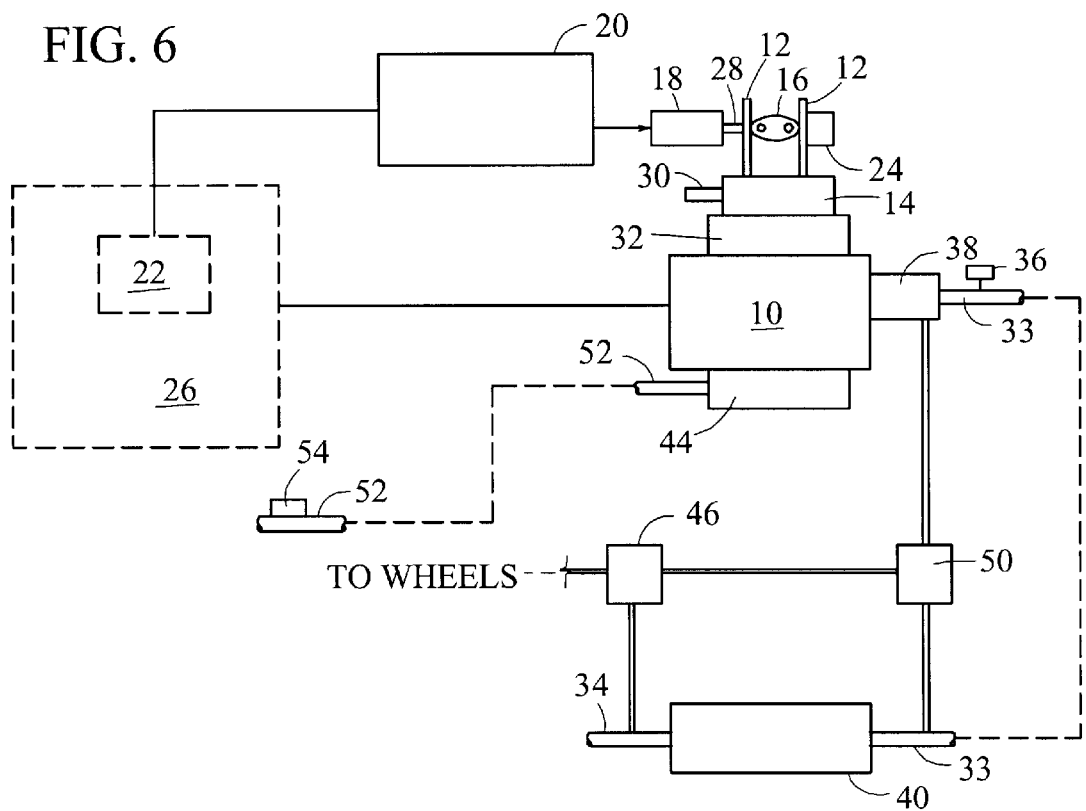
FIG. 6 illustrates a block diagram of 6—6 of FIG. 4 showing the powertrain system employing a cylinder deactivation system, torque smoothing system and an alternative embodiment of the auxiliary drive unit.

Referring generally now to FIGS. 1–2, a direct injection internal combustion engine 10 receives intake air through an air intake bore 12 into an intake manifold 14 for distribution to a plurality of engine cylinders (not shown). One or more throttle air valves 16, such as a butterfly valve, rotary valve, and the like, are positioned in the intake air bore 12, to selectively restrict the intake air entering the intake air bore 12. The throttle valve 16 can be electronically controlled. The valve 16 can be mechanically linked to a rotary actuator 18 of a motor (not shown; such as a conventional stepper motor, and the like), so as to rotate therewith in response to a current generated by an actuator drive circuitry 20 controlled by an electronic throttle control system 22. A rotary position sensor 24 transduces the rotational position of the throttle valve 16. The actuator drive circuitry 20, electronic throttle control system 22, and other conventional electronic control units/systems, electronically communicate with, and are controlled by an engine management system 26 of the automotive vehicle.

One or more fuel injection valves (not shown) are positioned within the cylinder head (not shown). The fuel injection valves are connected to a fuel pump (not shown) via a pressure regulator (not shown), and electrically connected to the engine management system 26 for controlling their timing and valve opening periods. An airflow sensor 28 can be positioned to transduce the airflow through the intake air bore 12. A conventional pressure transducer 30 can be positioned to transduce the absolute air pressure, also known as the manifold absolute pressure, in the intake manifold 14. A temperature transducer (not shown), such as a thermocouple or thermistor, can be positioned in one or more coolant circulation passages (not shown) located throughout the engine 10 to circulate engine coolant, and transduce the coolant temperature. The intake air passing through the intake manifold 14 is combined with a quantity of injected fuel (from a fuel source (not shown)) at a controlled air/fuel ratio (hereinafter "A/F ratio") and is delivered for combustion to the plurality of engine cylinders (not shown). The engine cylinders comprise pistons positioned therein for reciprocal motion, and driven by combustion pressure generated within the cylinders. Each engine cylinder also includes a spark plug whose ignition timing is controlled by the engine management system 26.

The engine management system 26 can send an injector pulse signal, the duration of which corresponds to a period of time that the fuel injector is open, as well as send signals to the cylinder deactivation system 32. During the fuel injector pulse time period, pressurized fuel is metered to one active engine cylinder at a time. In addition the engine management system 26 can also signal all or less than all available engine cylinders to begin firing, and selectively deactivate or activate each engine cylinder during operation.

The management system 26 carries out control, diagnostic, and maintenance operations, and includes, but is not limited to, such elements as microprocessors; volatile memory devices, such as random access memory devices; non-volatile memory devices, such as read only memory devices; an input/output control unit (hereinafter "I/O") for data transfer between the powertrain system and external devices; and combinations comprising at least one of the foregoing elements, and the like.

The I/O receives input signals through the execution of a series of routines, such as algorithms, comprising step-by-step instructions preferably stored in the non-volatile memory devices. The engine management system implements additional algorithms to provide powertrain system control, diagnostic, and maintenance operations. The powertrain system control includes functions such as controlling the cylinder deactivation system 32, controlling the direct cylinder injection system 44, controlling the torque-smoothing device 38, monitoring engine air intake rate and manifold absolute pressure, and the like. Effectively coordinating these various functions provides desirable engine performance having minimized engine emissions and maximized fuel economy.

When operating, the engine management system 26 can signal the cylinder deactivation system 32 to deactivate one or more engine cylinders. As the engine operates using less than all available cylinders, the resulting torque output becomes inconsistent. To smooth out the resulting inconsistent torque output, a torque-smoothing system, comprising a torque-smoothing device 38 coupled to an energy storage device 50, can be employed. The torque-smoothing device 38 can comprise an electrical system such as a conventional motor/generator device, coupled to an electrical energy storage device such as a battery, capacitor, ultra capacitor, and combinations comprising at least one of the foregoing electrical energy storage devices. In the alternative, the torque-smoothing device 38 can comprise a hydraulic system such as conventional hydraulic motor/pump device, coupled to a hydraulic energy storage device such as a hydraulic pressure accumulator, and the like. In either embodiment, the energy storage device 50 can preferably store a quantity of energy about equivalent to or greater than a design energy level. The energy storage device's design energy level can be a quantity of energy sufficient to smooth out an inconsistent torque output. In addition, or as an alternative, the energy storage device's design energy level can be a quantity of energy sufficient to assist in propelling the vehicle. Such a quantity of energy would be directed to an optional auxiliary drive unit 46 when necessary.

Referring now to FIGS. 3–6, an alternative embodiment of the powertrain system can employ an optional auxiliary drive unit 46. The auxiliary drive unit 46 can be electrically coupled to the energy storage device 50, and mechanically coupled to at least two wheels 42 via an axle 48 (See FIGS. 3, 5), or at least two wheels 42 via an axle 48 and the engine output shaft 34 (See FIGS. 4, 6). The auxiliary drive unit 46 can comprise either a hydraulic or electrical device designed to generate and store and/or release energy. For example, a hydraulic auxiliary drive unit can comprise a motor/pump device, while an electrical auxiliary drive unit can comprise a motor/generator device. In either embodiment, the auxiliary drive unit 46 can take energy released by the energy storage device 50 and utilize it to propel the vehicle. When employing the energy to propel the vehicle, the auxiliary drive unit 46 can release and distribute the energy to at least two wheels 42, or at least two wheels 42 and the engine output shaft 34, to provide all wheel drive or four-wheel braking ability to the vehicle. The auxiliary drive unit 46 can also generate/absorb energy and release that energy to the energy storage device 50 for regenerative braking usage. Alternatively, when the energy storage device's design energy level is being drawn down or at a minimal energy level, the auxiliary drive unit 46 can release energy to the energy storage device 50 to restore its design energy level.

Referring now to FIGS. 1–6, the torque-smoothing device 38 can discharge a sufficient quantity of energy during the time lapse between engine cylinder firings to compensate for the inconsistent torque output. When the engine management system 26 determines that the energy storage device 50 is being drawn down, the engine management system 26 can cause the torque-smoothing device to absorb more energy during torque peaks, or when activating additional engine cylinders. Conversely, if the engine management system 26 determines that the energy storage device 50 is at or near maximum energy levels, the engine management system 26 can signal the cylinder deactivation system 32 to deactivate one or more engine cylinders.

Ultimately, the number of cylinders deactivated or reactivated can be any number of cylinders required to adjust the average output of the engine 10 to match the desired engine performance level and/or to maintain the desired energy level in the energy storage device. This number of cylinders is not limited to conventional 4–6–8 or 4–8 cylinder activation/deactivation schemes of conventional internal combustion engines. Conventional 4–6–8 and 4–8 cylinder activation/deactivation schemes deactivate the same cylinders each time. In contrast, the cylinder deactivation taking place in the powertrain system illustrated in FIGS. 1–6, do not always or are not required to deactivate the exact same cylinders each time. The system provides the option to selectively deactivate the same cylinders or different cylinders each time cylinder deactivation takes place. This, in turn, maximizes fuel economy and minimizes additional emissions.

Engines operating using less than all available cylinders typically produce additional noise. To ensure customer satisfaction an active noise cancellation system 54 can optionally be incorporated into the powertrain system, preferably coupled to the exhaust system that is in fluid communication with the engine. Although some ambient noise may remain, the customer can learn to enjoy "the sound of economy" as an acceptable trade-off for improved emissions and fuel efficiency.

This powertrain system demonstrates, for example, how a V-8 engine can efficiently operate with the fuel economy of a much smaller engine, yet be smoother and more powerful. As engine cylinders are selectively deactivated, the torque-smoothing system will prevent irregular torque output. Likewise, as engine cylinders are selectively reactivated, or activated, the torque output, both torque irregularities and emissions, can be minimized efficiently and effectively. Since the torque-smoothing system operates by storing residual energy from the engine, the engine does not need to combust additional fuel to operate the torque-smoothing system. The engine can continue combusting only the fuel required to provide the desired power to the vehicle. Consequently, employing the torque-smoothing system, with cylinder deactivation effectively maximizes fuel economy while minimizing additional emissions.

Conventional powertrain systems are unable to selectively deactivate engine cylinders due to the resulting inconsistent torque output. Consequently, the automotive industry has not widely pursued cylinder deactivation schemes, even though such cylinder deactivation schemes can produce more efficient fuel combustion. However, by combining a torque-smoothing system along with both a cylinder deactivation system and direct cylinder injection system, the resulting powertrain system can effectively overcome the disadvantages associated with selectively deactivating engine cylinders.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A power train system, comprising:
    an engine;
    a drive shaft driven by said engine;
    a cylinder deactivation system coupled to said engine;
    a torque-smoothing system coupled to said engine, said torque-smoothing system comprising:
        an energy storage device, said energy storage device including at least one of an electrical energy storage device and a hydraulic energy storage device, and
        a torque-smoothing device, said torque-smoothing device provides energy to said energy storage device;
    a direct cylinder fuel injection system coupled to said engine; and
    an engine management system electrically connected to said engine, said drive shaft, said cylinder deactivation system, said torque-smoothing system, and said direct cylinder fuel injection system, said engine management system controls said cylinder deactivation system in response to a level of energy in said energy storage device.

2. The powertrain system of claim 1, wherein said torque-smoothing device includes at least one of a motor/generator system and a hydraulic motor/pump system.

3. The powertrain system of claim 2, wherein said electrical energy storage device is selected from the group consisting of a battery, capacitor, ultra capacitor, and combinations comprising at least one of the foregoing electrical energy storage devices.

4. The powertrain systems of claim 1, further comprising an electronic throttle control system coupled to said engine and said engine management system.

5. The powertrain systems of claim 1, further comprising an auxiliary drive unit coupled to said energy storage device and at least two wheels.

6. The powertrain systems of claim 1, further comprising an auxiliary drive unit coupled to said energy storage device, at least two wheels, and an engine output shaft.

7. A power train system, comprising:
    an engine;
    a drive shaft driven by said engine;
    a cylinder deactivation system coupled to said engine;
    a torque-smoothing system coupled to said engine;
    a direct cylinder fuel injection system coupled to said engine; and
    an engine management system electrically connected to said engine, said drive shaft, said cylinder deactivation system, said torque-smoothing system, and said direct cylinder fad injection system, wherein said torque-smoothing system further comprises a torque-smoothing device and an energy storage device, and
    wherein said torque-smoothing device further comprises a hydraulic motor/pump system and said energy storage device further comprises a hydraulic energy storage device.

8. The powertrain system of claim 7, wherein said hydraulic energy storage device further comprises a hydraulic pressure accumulator.

9. A power train system, comprising:
    an engine;
    a drive shaft driven by said engine;
    a cylinder deactivation system coupled to said engine;
    a torque-smoothing system coupled to said engine;
    a direct cylinder fuel injection system coupled to said engine;
    an engine management system electrically connected to said engine, said drive shaft, said cylinder deactivation system, said torque-smoothing system, and said direct cylinder fuel injection system; and
    an active noise cancellation system coupled to an exhaust system in fluid communication with said engine.

10. A method for operating an internal combustion engine, comprising:
    activating the engine to combust a fuel source;
    deactivating one or more engine cylinders;
    generating a torque output;
    activating a torque-smoothing system;
    smoothing said torque output; and
    reducing noise produced by said engine combustion with an active noise cancellation system.

11. A method for operating an internal combustion engine, comprising:
    activating the engine to combust a fuel source;
    generating a torque output;

activating a torque-smoothing system, said torque-smoothing system comprising a torque-smoothing device and an energy storage device, said energy storage device including at least one of an electrical energy storage device and a hydraulic energy storage device, and said torque-smoothing device providing energy to said energy storage device;

smoothing said torque output using said torque-smoothing system; and deactivating one or more engine cylinders in response to a level of energy in said energy storage device.

12. The method of claim 11, further comprising using a cylinder deactivation system.

13. The method of claim 11, further comprising activating one or more engine cylinders with a cylinder deactivation system.

14. The method of claim 11, further comprising reactivating one or more deactivated engine cylinders with a cylinder deactivation system.

15. The method of claim 11, wherein said deactivating said one or more engine cylinders includes measuring an amount of energy in said energy storage device.

16. The method of claim 15, further comprising determining whether said amount of energy of said energy storage device is sufficient to smooth said torque output.

17. The method of claim 16, further comprising determining whether said amount of energy is about equivalent to or greater than a design energy level for said energy storage device.

18. The method of claim 15, wherein said deactivating said one or more engine cylinders includes monitoring said energy storage device to determine a state of charge.

19. The method of claim 11, wherein said level of energy in said energy storage device is equivalent to or greater than a design energy level to smooth said torque output.

20. The method of claim 11, further comprising discharging an amount of stored energy from said energy storage device to a drive shaft coupled to said engine.

21. The method of claim 11, further comprising absorbing energy associated with braking and providing said energy to said energy storage device.

22. The method of claim 11, further comprising providing all wheel drive capability to at least two wheels using an auxiliary drive unit powered at least in part by said energy storage device.

23. The method of claim 11, further comprising discharging a quantity of energy from an auxiliary drive unit to said energy storage device of said torque smoothing system.

24. A method for operating an internal combustion engine, comprising:

activating the engine to combust a fuel source;
deactivating one or more engine cylinders;
generating a torque output;
activating a torque-smoothing system;
smoothing said torque output; and
actively controlling noise.

25. A method for determining how many engine cylinders to deactivate or reactivate in an internal combustion engine, comprising:

measuring a state of charge of a hydraulic energy storage device;

comparing said state of charge to a design energy level of said energy storage device;

deactivating one or more engine cylinders based upon said comparison; and reactivating one or more engine cylinders based upon said comparison.

26. The method of claim 25, wherein said deactivation further comprises employing a cylinder deactivation system.

27. The method of claim 25, wherein said reactivation further comprises employing a cylinder deactivation system.

28. The method of claim 25, further comprises determining whether said state of charge is about equivalent to or about greater than said design energy level.

29. The method of claim 25, wherein said deactivation further comprises determining said state of charge is about equivalent to or greater than said design energy level.

30. The method of claim 25, wherein said reactivation further comprises determining said state of charge is less than said design energy level.

* * * * *